Patented Dec. 6, 1938

2,138,870

UNITED STATES PATENT OFFICE 2,138,870

METHOD OF MAKING VITRIFIED PRODUCTS

Donald E. Lower, Aspers, Pa.

No Drawing. Application August 29, 1936,
Serial No. 98,596

7 Claims. (Cl. 25—156)

The invention relates to the manufacture of vitrified material.

An important object of the invention is to provide a method of manufacturing tiles, brick-work, blocks and granules in a manner and from materials which may be considered novel.

It is well known that methods have been devised for manufacturing vitrified or partially vitrified granules to be embedded in the face of tiles, bricks or the like or to be used per se by causing them to adhere to the surface of building or asphaltic paper or the like for the production of shingles, etc.

However, in the course of many years of experience and as the result of experimentation I have found that the production of vitrified products is greatly improved by the addition to the original mix of a variable but appreciable quantity of phosphoric acid, the result apparently being that a suitably plastic and puggable mass can be obtained with a less than usual water content and that the finished product is superior to that obtained without the use of phosphoric acid in that for some reason or other, not at present actually determined, the product resulting after pugging and subsequent treatment of the porcelain mass has much less tendency to shrinkage, a circumstance or condition which is of considerable importance.

It is another important object of the invention to provide a composition of matter, which is vitrifiable, which can be crushed prior or subsequent to vitrification so as to form granules which may be embedded in the surfaces of tiles and the like prior to vitrification thereof or which, after vitrification, are equally well adapted for use in the manufacture of roofing shingles or other equivalent material and for numerous other purposes such, for instance, as the construction of ornamental walks and many other purposes not necessary to be listed out.

Another object of the invention is to provide a method of manufacturing vitrified products which may be successfully carried out with the employment of clays of types regarded as containing impurities which in past practice have been thought to be excessively detrimental to the character of the finished product.

A still further object of the invention is to provide a composition of matter and a method of utilizing the same for producing granules and the like of selected colors, this resulting from a judicious use of clays obtainable from certain localities, and also a selection of inorganic coloring agents which may not be inherent in the local clays themselves but which can be derived from other sources and added to the mix.

A still further object is to provide a method of making vitrified products which may be carried out by a simple ball-mill or wet pan grinding and subsequent pugging without the necessity for any filter pressing, though the latter may be followed through if preferred.

An additional object is to provide a composition for and method of forming vitrified products which will be simple, inexpensive, easy to carry out, readily controllable, and a general improvement in the art.

To the attainment of the foregoing and other objects, the invention preferably comprises the various materials and method steps to be hereinafter more fully described and claimed.

In carrying out the invention, by using clays having approximately 15 to 35% or less of aluminum content and from 50 to 70% of silica content it is possible, by mixing with this material a certain percentage of phosphoric acid in syrupy form, to produce a mass having a high degree of plasticity well adapted for making various articles and materials having superior characteristics. A blend of clays containing the so-called impurities such as magnesium, calcium and/or zinc may be used and on account of the employment of the phosphoric acid will have no detrimental effect upon the product.

I have found that by using from 3 to 10 gallons of phosphoric acid to the ton of mix, and of course a certain amount of water, say from 15 to 30% of the mass, excellent results can be obtained. After the ingredients are mixed, the material is then treated in a pug mill where the water and acid will permeate the mass so that it will be homogeneous throughout. After the mass is pugged and extruded therefrom in the usual or any preferred manner, it is dried and fired, after which it may be broken or crushed to produce granules adapted to be embedded in tiles, building blocks or walls, or to be cemented onto slabs of appropriate material to form shingles. Likewise the granules can be used dry for example in constructing ornamental garden walks and the like.

It should be understood that the amount of acid required for proper vitrification at a comparatively low temperature necessarily depends upon the type of clay and the per cent of concentration of the acid. As mentioned above I prefer to use from 3 to 10 gallons per ton of mix and likewise prefer to use the cheap commercial or by-product acid listed as 50% concentration.

I have discovered that very beautiful color effects may be obtained sometimes by the introduction within the mix of certain inorganic chemicals or by using clays obtainable from certain localities, or a blend of clays. For instance with some red clays the use of the acid in the mix not only resulted in vitrification at a lower temperature but produced a material in which the color was intensified or brightened. With the local manganese ore clay, such as is found in Cumberland County, Pennsylvania, and the use of acid a jet vitreous black is produced at approximately cone 3. Using certain other clays results in obtaining a tile with a buff background and rust red speckles, while with another clay the product turns out with beautiful red veins in a buff background. In another instance the cream cast of certain natural clays is converted into a beautiful buff. The above effects can be had with the use of one clay or a blend of clays provided the acid is used.

Instead of relying upon the natural characteristics of the clay to secure a desired color effect, inorganic chemicals may be introduced within the mix, as mentioned above. For instance for a green color $Cr_2O_3$ may be used; for red $Fe_2O_3$; for black $MnO$; for chocolate a combination of those chemicals producing red and black; for gray, chromate of iron; for blue, either the carbonate or the oxide of cobalt; for buff, rutile or certain prepared stains; for yellow, varieties of ochre or yellow body stains; for pink, pink stains or calcined Japanese ochre; for orchid, a combination of the above mentioned pink or cobalt producing ingredients; for tans, natural clay bodies; for white, likewise natural clay bodies well known in the art. The above mentioned chemicals are merely suggestions as to what may be employed for coloring purposes and I have found that the presence of the phosphoric acid may in some instances change the original nature of the chemicals so that the colors produced may not be in strict accord with what is listed out above and the same is true depending upon the particular clay or clays used. It requires experimentation to determine just exactly what color or colors will result as certain clays contain, naturally, certain chemicals which may react not only with the acid but with any inorganic coloring material added and produce a result which may be somewhat unexpected.

More specifically, after whatever vitrifiable clay, or blend of clays, is selected, it is of course necessary that it or they together with the selected coloring matter, if any is used, be ground and this may conveniently be done in a ball mill wherein the mixed materials will be thoroughly commingled. This dry material must then have the water and phosphoric acid added to it and the mass is placed within a pug mill and pugged. If it is desired to produce granules it might be preferable to extrude the pugged material through relatively small discharge nozzles of any desired cross sectional shape so that the resulting rod-like pieces or strips may be more quickly, easily and uniformly dried. The rods, strips or ribbons may be broken up before firing, and then fired, or the rods, strips or ribbons may be fired and subsequently crushed. To obtain granules of substantially uniform size sifting would have to be resorted to. If the fines are undesired they may be sifted out and will probably have some commercial value.

One of the most important and highly desirable results obtained by the use of phosphoric acid and clay mixes is that for some reason or other which is difficult, if not impossible, to explain, the vitrifiable mass does not shrink or at least shrinks much less than other mixes when firing takes place. Actual practice has proven that taking two tiles of the same size, one made of a mix containing phosphoric acid and the other from a mix without it, when vitrification occurs the tile or brick made up of the phosphoric acid mix shrinks very much less than the other.

It is of course apparent that the carrying out of the invention is not limited to making granules or bricks and the like as it should be understood that solid tiles, bricks or the equivalent can be made by utilizing the same method. In the case of a plastic process, the clay, or combination of clays, together with any coloring matter, if any is used, should be pugged with water and phosphoric acid, the mass being then formed into plastic tiles, dried and subsequently fired, thus producing tiles, bricks, blocks or the like, of a uniform color and texture throughout. With the dry press method, the clay, or combination of clays, with or without coloring matter, should be pugged with water and phosphoric acid, dried to the desired moisture content, say from 5 to 10%, and then ground into dust of sufficient fineness to pass approximately a sixteen mesh screen, after which the ground material is pressed into the desired shapes and sizes and subsequently fired.

Regardless of whether the plastic or the dry press method be used, it may be necessary to ball-mill or wet pan the material prior to pugging, this of course depending on the nature of raw materials used and the color or oxide added. In the dry press method, pugging would not be necessary if the acid were to be added to the mix in the ball-mill or wet pan.

From the foregoing description it is believed that the choice of materials and the carrying out of my invention in every respect will be a distinct improvement in the art which should be understood without further explanation.

While I have described certain clays and certain variable proportions of phosphoric acid and water as well as many possible inorganic substances capable of effecting coloring, it should be understood that the disclosure is merely an exemplification of the principles involved and that the right is reserved to make all such changes as will constitute no departure from the spirit of the invention or the scope of the subjoined claims.

Having thus described the invention, I claim:

1. The method of making vitrified granules comprising dry grinding a blend of selected clays having selected color characteristics, adding sufficient water mixed with phosphoric acid to said ground product to produce a plastic mass, pugging the mass to effect a complete commingling of the ingredients thereof, extruding the mixed material, drying the same and subsequently firing the dried extruded material to effect vitrification, and then crushing the fired material to define granules.

2. The method of making a product such as tiles, or the like, comprising making a mix of selected vitrifiable clays with water to which has been added a small percentage of phosphoric acid to change said mix into a plastic mass, forming the plastic mass into desired shapes, drying the same and then firing.

3. The method of making a ceramic product, such as tiles or the like, comprising making a mix of selected vitrifiable clays, adding to said mix a fluid composed of water and phosphoric acid, drying the mass to a moisture content of between 5 and 10%, grinding the dried mass into a relatively fine dust, pressing the ground material into desired shapes and then firing the same.

4. The method of making a ceramic product such as a tile or the like, comprising making a mix of selected vitrifiable clays, mixing the same with water and a small amount of phosphoric acid, drying the mixed mass and subsequently adding thereto additional water to permit the mass to be pressed, grinding the pressed mass into relatively fine dust, and finally pressing the ground material into a desired shape and subsequently firing such shape.

5. The method of making a ceramic product, such as tiles or the like, comprising mixing selected vitrifiable clays with water and a relatively small percentage of phosphoric acid, forming the mixed mass into the desired shapes, and subsequently firing the same.

6. The method of making a ceramic product, such as tiles or the like, comprising making a mix of selected vitrifiable clays with water to which has been added a small percentage of phosphoric acid to change said mix into a semi-plastic mass, pulverizing the semi-plastic mass, forming said mass into the desired shapes, drying the same and then firing.

7. The method of making a ceramic product, such as tiles or the like, comprising making a mix of selected vitrifiable clays, adding to said mix a fluid composed of water and phosphoric acid, drying the mass to a moisture content suitable for grinding and pressing, grinding the dried mass, pressing the ground mass into the desired shapes and finally firing the same.

DONALD E. LOWER.